(12) United States Patent
Lamberts

(10) Patent No.: US 6,442,705 B1
(45) Date of Patent: Aug. 27, 2002

(54) METHOD OF AND APPARATUS FOR IMPROVING DATA INTEGRITY IN A DISK DRIVE SYSTEM

(75) Inventor: Bernd Lamberts, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,303

(22) Filed: Apr. 26, 1999

(51) Int. Cl.[7] ................................................. H04L 1/22
(52) U.S. Cl. ........................................... 714/2; 711/112
(58) Field of Search ............................ 714/2, 5, 20, 25, 714/42, 44, 48, 16; 360/75–78, 78.06, 78.04, 78.12, 78.09, 78.14; 711/112, 143

(56) References Cited

U.S. PATENT DOCUMENTS

| | | | |
|---|---|---|---|
| 4,516,165 A | | 5/1985 | Cunningham et al. ......... 360/53 |
| 4,536,809 A | * | 8/1985 | Sidman ......................... 360/77 |
| 4,620,243 A | | 10/1986 | Bakken et al. ................. 360/77 |
| 4,644,421 A | | 2/1987 | Miwa et al. .................... 360/66 |
| 4,816,941 A | * | 3/1989 | Edel et al. .................. 360/78.12 |
| 4,879,612 A | * | 11/1989 | Freeze et al. ............. 360/78.06 |
| 4,920,462 A | * | 4/1990 | Couse et al. .............. 360/78.04 |
| 5,126,895 A | | 6/1992 | Yasuda et al. ............ 360/77.07 |
| 5,132,855 A | * | 7/1992 | Waugh et al. ............. 360/78.07 |
| 5,305,161 A | * | 4/1994 | Giovanetti et al. ...... 360/78.06 |
| 5,333,138 A | | 7/1994 | Richards et al. ................. 371/7 |
| 5,353,170 A | | 10/1994 | Fung et al. .................... 360/53 |
| 5,392,290 A | | 2/1995 | Brown et al. ............... 371/10.1 |
| 5,570,244 A | | 10/1996 | Wiselogel .................... 360/60 |
| 5,909,334 A | * | 6/1999 | Barr et al. ..................... 360/53 |

FOREIGN PATENT DOCUMENTS

| | | | |
|---|---|---|---|
| JP | 60277001 | 12/1985 | ........... G11B/20/18 |
| JP | 62119521 | 5/1987 | |
| JP | 61133526 | 6/1989 | |
| JP | 01312112 | 11/1989 | |
| JP | 04262715 | 9/1992 | |
| JP | 6-52635 | 2/1994 | |

OTHER PUBLICATIONS

"Adaptive Write–Inhibit Architecture," *IBM Technical Disclosure Bulletin*, vol. 40, No. 05, May 1997.
"Date Re–Write Procedure For Magnetic Recording Device," *IBM Technical Disclosure Bulletin*, vol. 34, No. 6, Nov. 1991.
"Preventative Rewrites," *IBM Technical Disclosure Bulletin*, vol. 33, No. 12, May 1991.
"Prevention Of Hard Errors In Magnetic Files Due To Long Term Degradation," *IBM Technical Disclosure Bulletin*, vol. 29, No. 10, Mar. 1987.

* cited by examiner

*Primary Examiner*—Nadeem Iqbal
(74) *Attorney, Agent, or Firm*—Altera Law Group, LLC

(57) ABSTRACT

A disk drive operative to reduce squeeze hard error is described. In response to a write fault (404) indicating that data has been inadvertently written to some portion of a track adjacent to an intended track, track overshoot is determined (416) based on a position error signal (PES) and pre-stored head width data. If the track overshoot exceeds a threshold (418), data from the adjacent track is read and rewritten (422) to remove the overshoot interference. Preferably, the reading and rewriting is performed during an idle mode immediately following the write fault using previously stored addresses.

20 Claims, 6 Drawing Sheets

METHOD OF AND APPARATUS FOR IMPROVING DATA INTEGRITY IN A DISK DRIVE SYSTEM

BACKGROUND OF THE INVENTION

1. Field of the Invention

The present invention relates generally to disk drives, and more particularly relates to improving data integrity in disk drives.

2. Description of the Related Art

One of the key components in a computer system is the place to store and retrieve data. Typically, computer systems employ a number of storage means, including a disk drive which may be referred to as a direct access storage device (DASD). A disk drive includes several disks stacked on a spindle. The disks are mounted to the spindle in a spaced-apart relationship so that the separate disks do not touch each other. Both sides of each disk are generally used to store data.

Each disk surface is divided into portions where data is stored. There are a number of tracks situated in concentric circles, and each track in a disk drive is further subdivided into a number of sectors which generally comprise a section of the circumferential track. Disks in a disk drive are made of a variety of materials; most commonly, the disk is made of metal, plastic, or glass. To store and retrieve data on a disk, a magnetic transducer known as a read/write head is passed over the surface of the disk. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface in close proximity to the disk. The transducer or read/write head is provided to produce and detect variations in magnetic orientation of the magnetic material as the disk rotates relative to the head.

Positioning read/write heads is one of the most critical aspects of recording and retrieving data in disk storage systems. With the very high track density of current disk drives, even the smallest head positioning error can potentially cause a loss of data that a disk drive customer wants to record or read.

The read/write head is mounted on a disk arm that is moved across the disk by a servo. A disk drive servo control system controls movement of the disk arm across the surface of the disk to move the read/write head from data track to data track and, once over a selected track, to maintain the head in a path over the centerline of the selected track. Maintaining the head centered over a track facilitates accurate reading and recording of data in the track.

A servo control system generally maintains a read/write head in a position centered over a track by reading servo information recorded onto the disk surface. The servo read head can be the same head used for reading data or can be a separate, dedicated servo head. The servo information comprises a position-encoded servo pattern of high frequency magnetic flux transitions, generally flux reversals, that are pre-recorded in disk servo tracks. The flux transitions are recorded as periodic servo pattern bursts formed as parallel radial stripes in the servo tracks. When the read/write head passes over the servo pattern flux transitions, the head generates an analog signal whose repeating cyclic variations can be demodulated and decoded to indicate the position of the head over the disk. The demodulated servo signal is referred to as a position error signal (PES). The PES is used to generate a corrective input signal that is applied to the read/write head positioning servo. Thus, data may be read from and recorded to the appropriate track with a good degree of accuracy. A write inhibit signal is used to terminate transmission of a write signal to a head during a time period that the servo signal indicates that the head is off center by an amount that would result in writing data in an adjacent track.

Although such measures are taken for accurate positioning of the heads, some portions of adjacent tracks may still be inadvertently written along during writes to target tracks. Such inadvertent writing adversely affects the signal-to-noise (SNR) ratio of these adjacent tracks and thus data errors may result during subsequent reads. The errors may be referred to "soft errors," where data recovery is possible, or "hard errors," where the errors are so severe that data recovery is not possible. Errors become more likely when such interference undesirably resides on both sides of a track. Continuing efforts to decrease the width of magnetic heads exacerbate this "squeeze hard error" problem, since error tolerances associated with head width generally increase in cost-effective designs.

Thus, what is needed is a method and apparatus for improving data integrity in a disk drive system, and especially one that solves the aforementioned deficiencies of the prior art.

SUMMARY OF THE INVENTION

A method of and apparatus for improving data integrity in a disk drive system is disclosed. In response to a write fault, it is determined whether an excessive track overshoot condition exists based on current head position, head width, and threshold criteria. If an excessive track overshoot condition exists, data is read from and rewritten to one or more tracks adversely affected thereby. Preferably, the current head position is based on a position error signal (PES) and the head width is pre-stored data indicative of the physical or magnetic head width measured prior to disk drive operation.

DETAILED DESCRIPTION OF THE PREFERRED EMBODIMENTS

Figure 1:
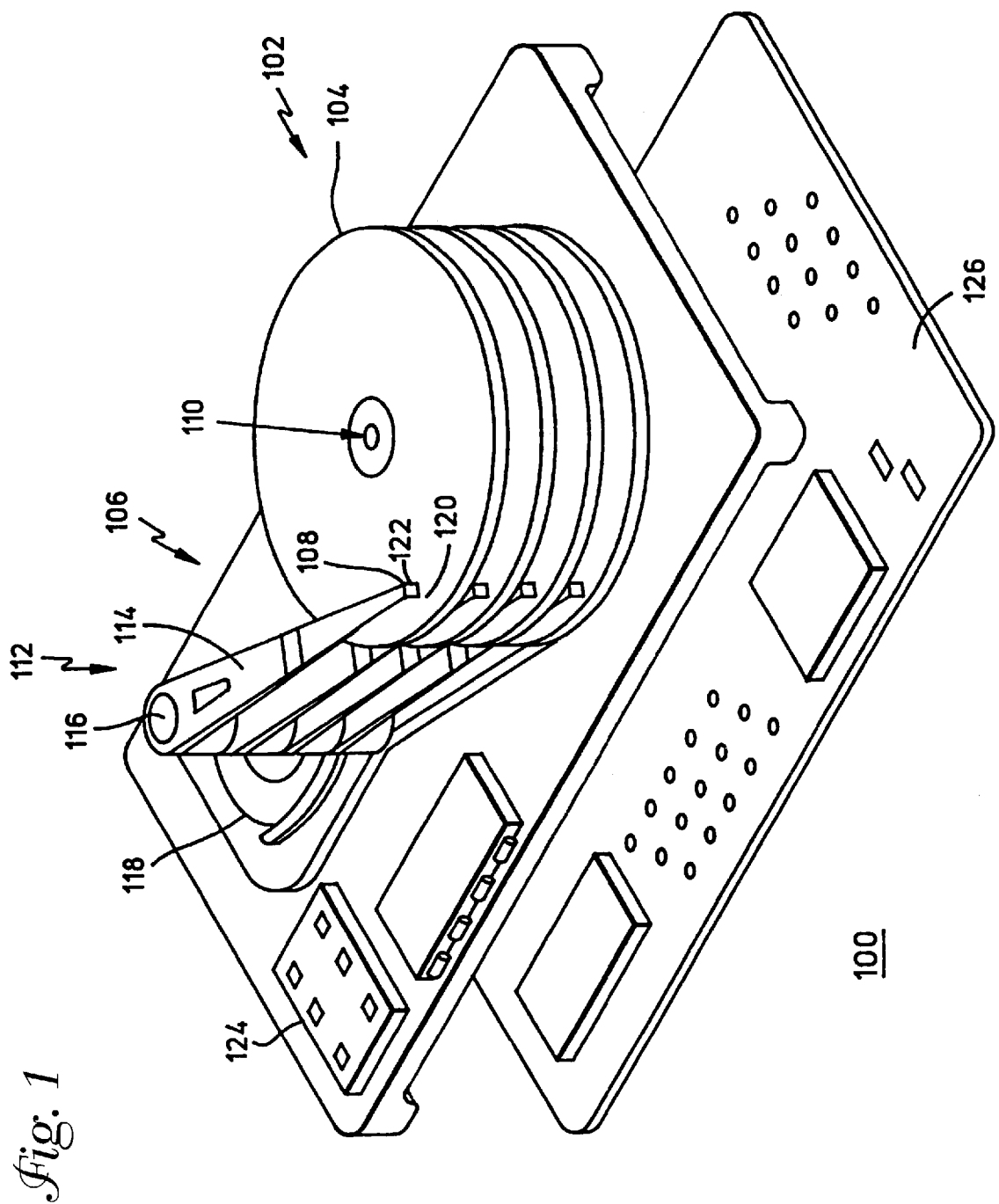
FIG. 1 is a perspective view of a disk drive which may embody the present invention.

Referring now to the drawings, and initially to FIG. 1, there is illustrated an example of a disk drive 100. Disk drive 100 includes a stack of storage disks 102, such as a storage disk 104, and a corresponding stack of read/write heads 106, such as a read/write head 108. Each of the storage disks 102 is provided with a plurality of data tracks to store user data. As illustrated in FIG. 1, one head is provided for each surface of disks 102 such that data can be read from or written to the data tracks of all of the storage disks. It is understood that disk drive 100 is merely representative of a disk drive system utilizing the present invention and that the present invention can be implemented in a disk drive system including more or less storage disks.

Disks 102 are mounted for rotation by a spindle motor arrangement 110 as is known in the art. Moreover, heads 106 are supported by respective actuator arms 112, such as an actuator arm 114, for controlled positioning over preselected radii of disks 102 to enable the reading and writing of data from and to the data tracks. To that end, actuator arms 112 are rotatably mounted on a pin 116 by a voice coil motor 118 operable to controllably rotate actuator arms 112 radially across surfaces of disks 102.

Each of heads 106 is mounted to a respective actuator arm 112 by a suspension element (not shown) and comprises a magnetic transducer 120 mounted to a slider 122 having an air bearing surface (ABS) (not shown), all in a known manner. As typically utilized in disk drive systems, sliders 122 cause magnetic transducers 120 of heads 106 to "fly" above the surfaces of the respective disks 102 for non-contact operation of the disk drive system.

A printed circuit board (PCB) 126 is provided to mount control electronics for controlled operation of spindle motor 110 and voice coil motor 118. PCB 126 also includes read/write channel circuitry coupled to heads 106 to control the transfer of data to and from the data tracks of disks 102. To that end, a preamplifier 124 is mounted adjacent voice coil motor 118 to electrically couple heads 106 to the read/write channel circuitry. Pre-amplifier 124 includes an amplification stage to amplify electrical signals transduced by a head during a read operation, and a write driver arrangement to transmit a current to a head in a write operation. The manner for coupling PCB 126 to the various components of disk drive 100 is well known in the art.

Figure 2:
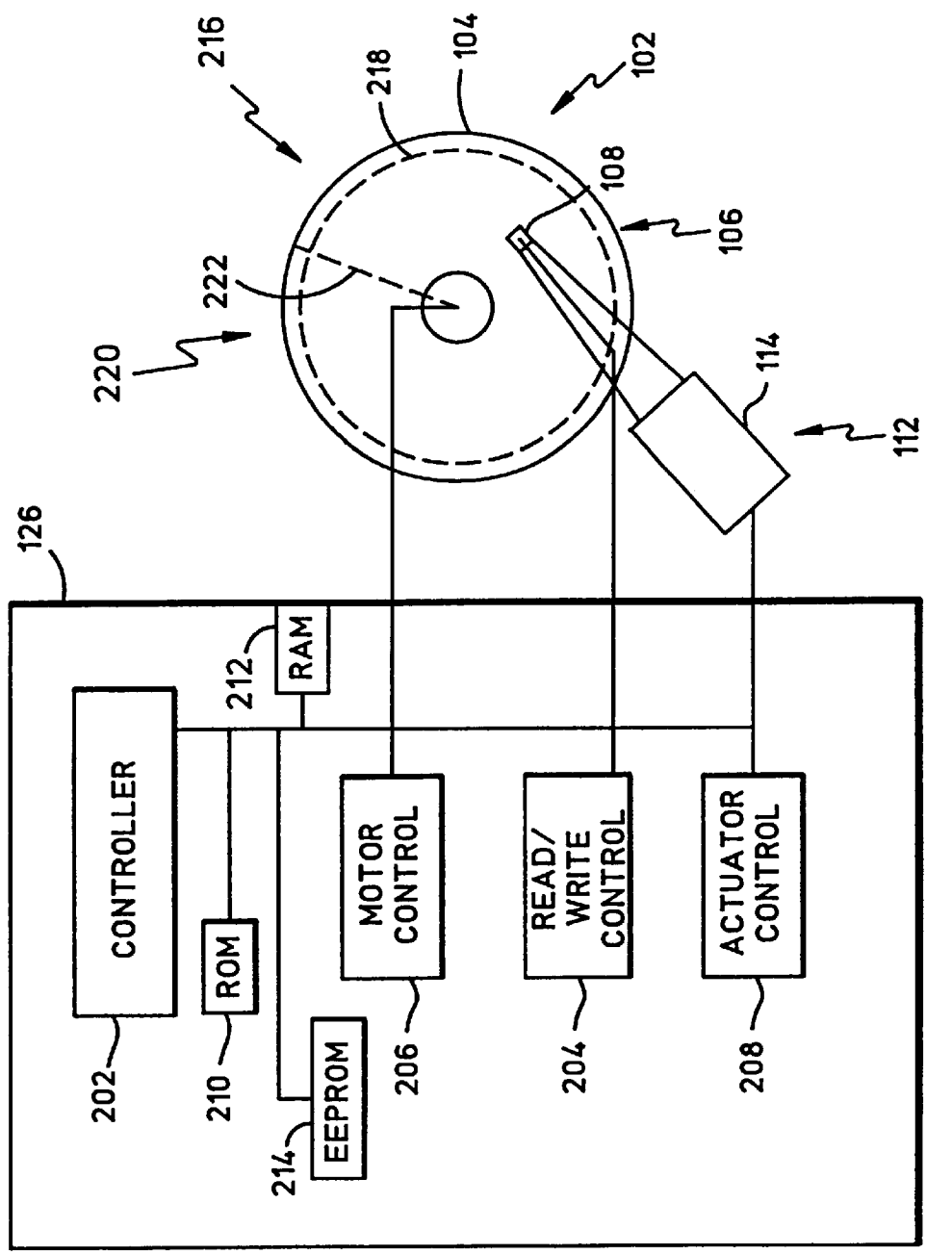
FIG. 2 is a schematic block diagram of the disk drive.

Referring now to FIG. 2, there is illustrated, in schematic block diagram form, PCB 126 and electrical couplings between the control electronics on PCB 126 and the components described above. A controller 202, which may be a microprocessor or microcontroller, is coupled to each one of a read/write control 204, a spindle motor control 206, an actuator control 208, a read only memory (ROM) 210, a random access memory (RAM) 212, and an electrically erasable/programmable read only memory (EEPROM) 214. In modern disk drive designs, controller 202 may comprise a digital signal processor (DSP). Controller 202 sends data to and receives data from disks 102 via read/write control 204 and heads 106.

Controller 202 operates according to instructions stored in ROM 210 to employ conventional techniques as well as inventive methods described herein. Thus, the invention described herein may be embodied as a computer program product including a computer readable storage medium and a computer program mechanism embedded therein. The computer program mechanism has instructions which are executable by a controller or processor to perform particular functions described herein (e.g., in relation to FIGS. 4A and 4B).

Each of disks 102, such as disk 104, include a plurality of tracks 216 such as a track 218. At the present time, the number of tracks on a given disk typically range from about one thousand to twenty thousand tracks. Each track is divided into a number of data sectors available for data storage. In addition, each of disks 102 include a plurality of servo patterns 220 such as a servo pattern 222 embedded therein. At the present time, the number of servo patterns on a given disk typically range from about fifty to one hundred patterns, and typically comprise about three to ten percent of the available space on a disk. As described above, disk drive 100 utilizes the plurality of servo patterns 220 to maintain a fairly accurate position along a particular track being accessed and, to this end, a position error signal (PES) is generated as is known or described. Such a servo arrangement is referred to as an embedded servo system.

With respect to other conventional operations, controller 202 operates to generate and transmit control signals to each of spindle motor control 206 and actuator control 208. Spindle motor control 206 is responsive to the control signals received from controller 202 to generate and transmit a drive voltage to spindle motor 110 (FIG. 1) to cause disks 102 to rotate at an appropriate rotational velocity. Similarly, actuator control 208 is responsive to control signals received from controller 202 to generate and transmit a voltage to voice coil motor 118 (FIG. 1) to controllably rotate heads 106, via actuator arms 112, to preselected radial positions over disks 102. The magnitude and polarity of the voltage generated by actuator control 208, as a function of controller's 202 control signals, determines the radial direction and speed of heads 106.

When data to be written or read from one of the disks 102 are stored on a data track different from the current radial position of heads 106, controller 202 determines the current radial position of heads 106 and the radial position of the data track where heads 106 are to be relocated. Controller 202 then implements a seek operation wherein the control signals generated by controller 202 for actuator control 208 cause voice coil motor 118 to move heads 106 from the current data track to a destination data track at the desired radial position.

When actuator control 208 has moved heads 106 to the destination data track, pre-amplifier 124 is used to coupled heads 106 over the specific data track to be written or read, to read/write control 204, as is generally known in the art. Read/write control 204 includes a read channel comprising an electronic circuit that detects information represented by magnetic transitions recorded on the disk surface within the radial extent of the selected data track.

During a read operation, electrical signals transduced by the head from the magnetic transitions of the data sectors are amplified by pre-amplifier 124 (FIG. 1) and input to the read channel of read/write control 204 for processing. RAM 212 can be used to buffer data read from or to be written to the data sectors of disks 102 via read/write control 204. The buffered data can be transferred to or from a host computer utilizing the disk drive for data storage.

Controller 202 is preferably involved in the head positioning and embedded servo system operation. As a conventional example, servo information may comprise two separate servo bursts of N transitions, one recorded on one side of the track centerline and the other recorded on the opposite side of the track centerline. Whenever a head is over a servo sector, the head reads each of the servo bursts and the signals resulting from transduction of the bursts are transmitted to controller 202 for processing. When the head is properly position over a track centerline, the head will straddle two bursts, and the strength of the combined signals transduced from the burst on one side of the track centerline will equal the strength of the combined signals transduced from the burst on the other side of the track centerline.

Controller 202 is preferably used to perform a "track following" operation, which basically entails the subtraction of one burst value from the other each time a servo sector is read by the head. When the result is zero, controller 202 detects that the two signals are equal, indicating that the head is properly positioned. If the result is other than zero, then one signal is stronger than the other, which indicates that the head is displaced from the track centerline and overlying one of the bursts more than the other. The magnitude and sign of the subtraction result may be used by controller 202 to determine the direction and distance the head is displaced from the track centerline, and generate a control signal to move the actuator back towards the centerline.

Figure 3:
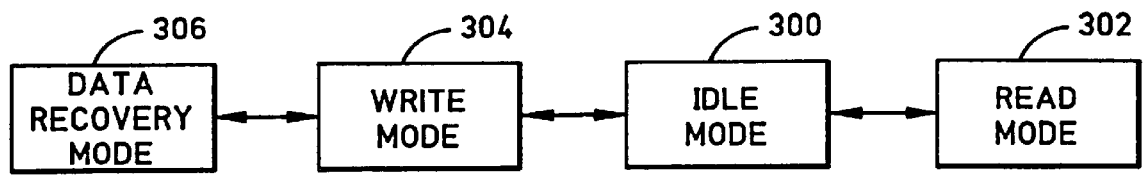
FIG. 3 is a simplified state diagram of the disk drive.

Referring now to FIG. 3, a simplified state transition diagram of a disk drive is shown. A disk drive has an idle mode 300, where generally no critical commands or tasks are being executed by the controller. Upon receipt of a read command during idle mode 300, the disk drive enters a read mode 302 where it reads data from a disk along a particular track or tracks. Upon receipt of a write command during idle mode 300, the disk drive enters a write mode 304 where it writes data to a disk along a particular track or tracks. During write mode 304, the disk drive may enter a data recovery mode 306 in response to a write inhibit signal, indicating that the head is off-center by an amount that is specified to be too large.

Figure 4A:
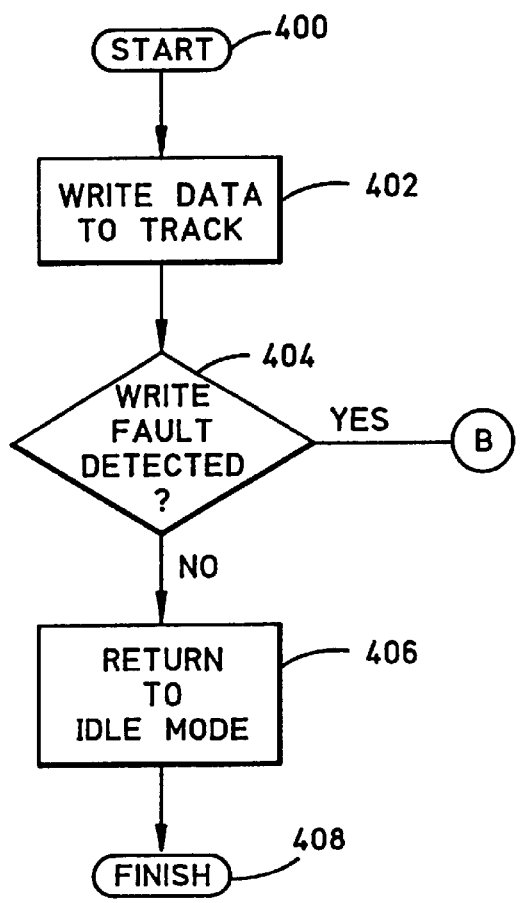
FIGS. 4A and 4B form a flowchart describing one example of a method of improving data integrity in a disk drive system.
Figure 4B:
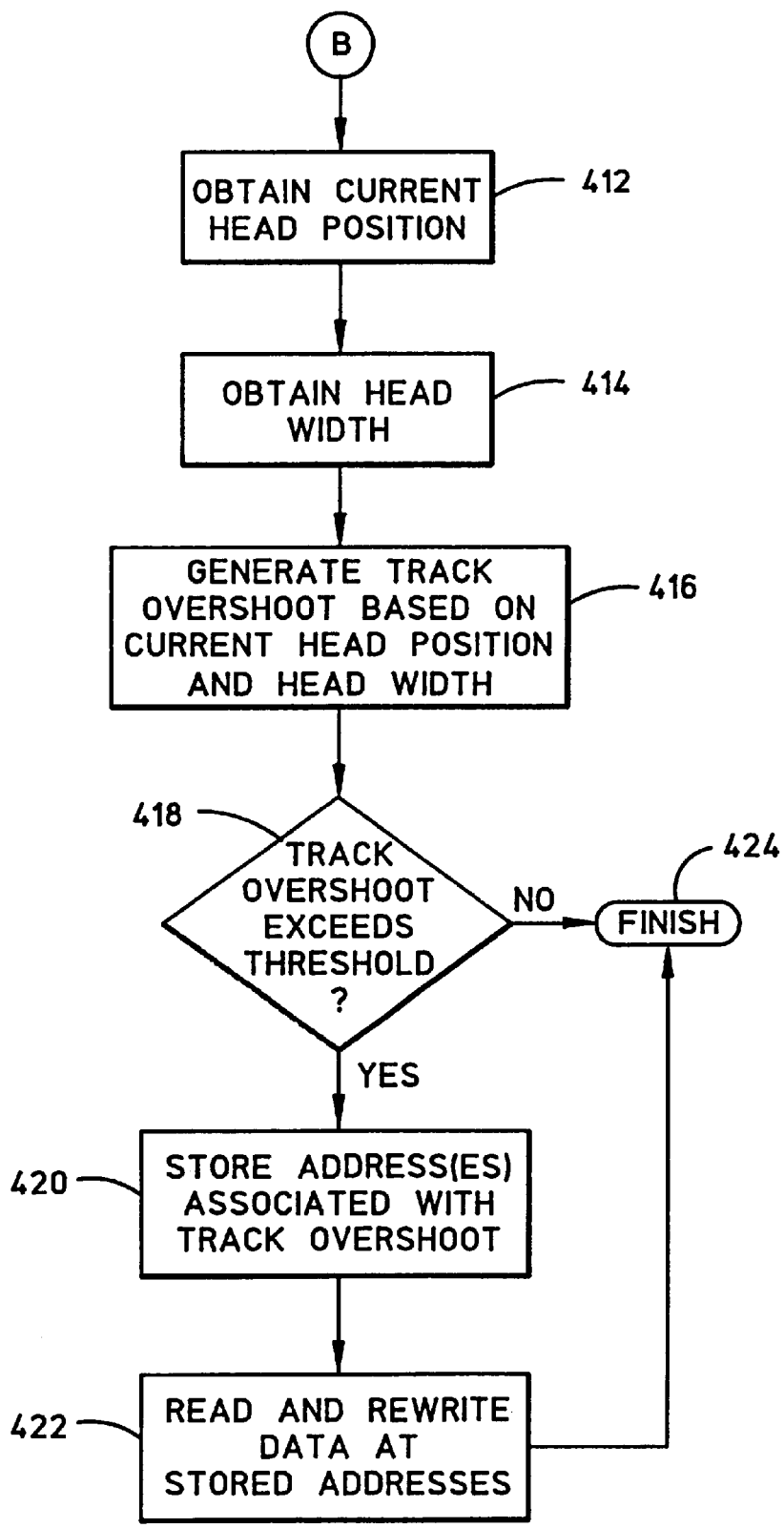

FIGS. 4A and 4B comprise a flowchart describing one example of a method of improving data integrity in a disk drive system. In the following description, FIGS. 4A and 4B may be referred to in combination with FIG. 2.

The method begins at a start block 400 in FIG. 4A. A write command is received, where the disk drive proceeds to write data along a particular track or tracks of a disk (step 402). The PES is used to guide the head as described. If a write fault or track misregistration (TMR) is detected by controller 202 (step 404), the flowchart continues in FIG. 4B through a connector B. The write fault is preferably invoked and detected in response to a position error exceeding somewhere between about ten and twenty percent. If a write fault is not detected by controller 202 at step 404, then the disk drive enters the idle mode after completion of the write.

Continuing at the connector B in FIG. 4B, in response to the write fault, controller 202 obtains the current head position based on the PES signal (step 412). Controller 202 also obtains a head width of the magnetic head (step 414).

Preferably, the head width is obtained from data stored in memory, and is based on measurements or known quantities available during design or manufacturing. Although such data may be stored in ROM 210, the data is preferably programmed in EEPROM 214. The head width may comprise the physical width of the head, or the magnetic width of the head which is based on other factors such as throat high. Such quantities may be determined using well-known, conventional methods. At the present time, a typical head width measures at about one micron.

Next, controller 202 generates data indicative of track overshoot based on the current head position and the head width (step 416). In general, the track overshoot is the approximate amount by which the head has encroached upon the adjacent track or tracks (e.g., physically or magnetically).

If the track overshoot exceeds a threshold, then controller 202 stores address(es) associated with the track overshoot in RAM 212 (step 420). Here, controller 202 stores addresses (e.g., logical block addresses or LBAs) of the adjacent tracks where data may have been adversely affected by the inadvertent writing. Preferably, the LBAs stored include all of those LBAs affected from one servo identifier (SID) to the next SID (or for two SID distances if needed). The threshold is preferably determined according to some analysis during design or manufacturing, and stored in ROM 210 or EEPROM 214. A suitable threshold may be determined based on the total likelihood of hard error for the system, which is assessed based on those known quantities (derived using suitable conventional methods).

Controller 202 then proceeds to read and rewrite data from the adjacent track(s) at the stored address(es) (step 422). This step is performed to remove or erase interference caused by the previous inadvertent writing. The data read from the adjacent tracks includes the data stored on those tracks prior to the previously recorded interference. Although these adjacent tracks include some interference at the time of reading in step 422, such interference is not significant enough at that time to cause read errors. Thus, the same data is rewritten so that the previously recorded interference is eliminated or reduced.

Although reading and rewriting data (step 422) may be performed immediately during the data recovery mode following the write fault, it is preferably performed sometime during the idle mode following the write fault when no other important tasks are occurring. In this way, the data recovery is more transparent to an end user of a computer system.

The method ends at a finish block 424. If the track overshoot does not exceed the threshold at step 418, then the method ends at finish block 424 without performing steps 420 and 422. Preferably, the method of FIGS. 4A and 4B repeats for each write command issued to the disk drive.

Figure 5:
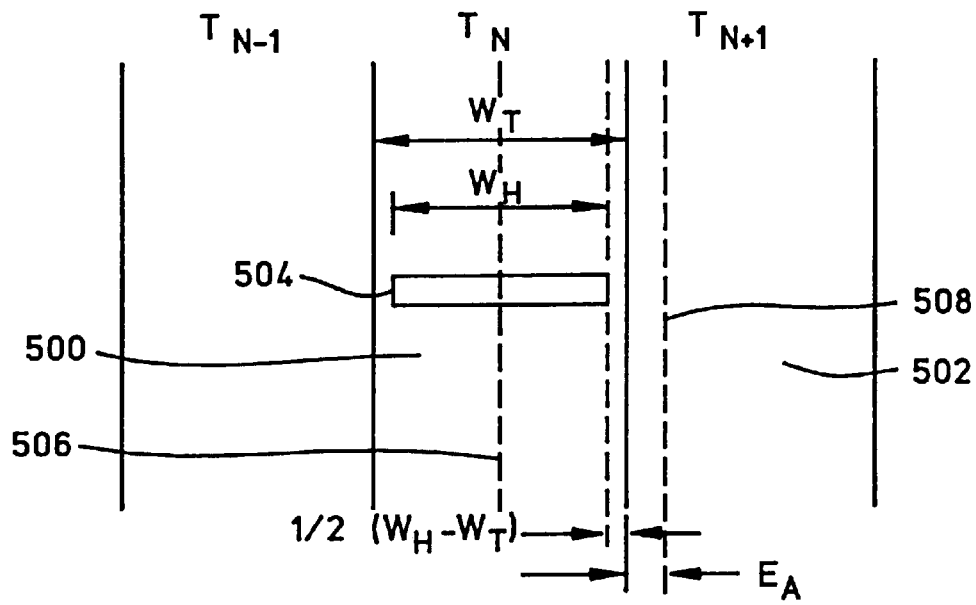
FIG. 5 is a plan view of data tracks of a disk, where a magnetic head is positioned substantially in the center of a target track.
Figure 6:
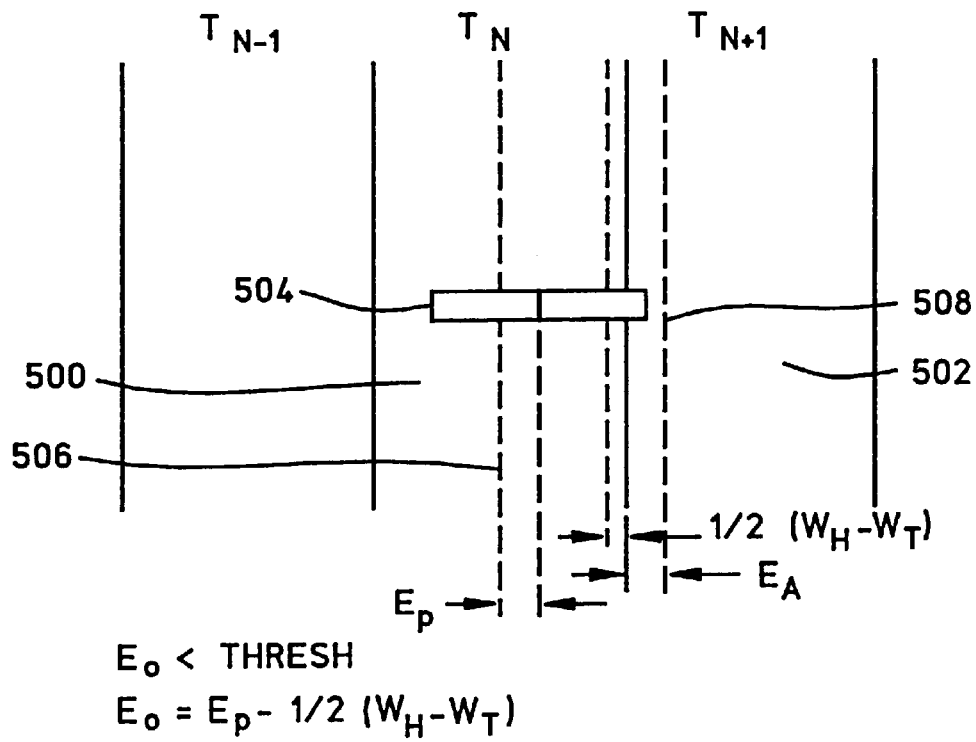
FIG. 6 is a plan view of the data tracks of the disk, where the magnetic head is positioned somewhat off-center relative to the target track.
Figure 7:
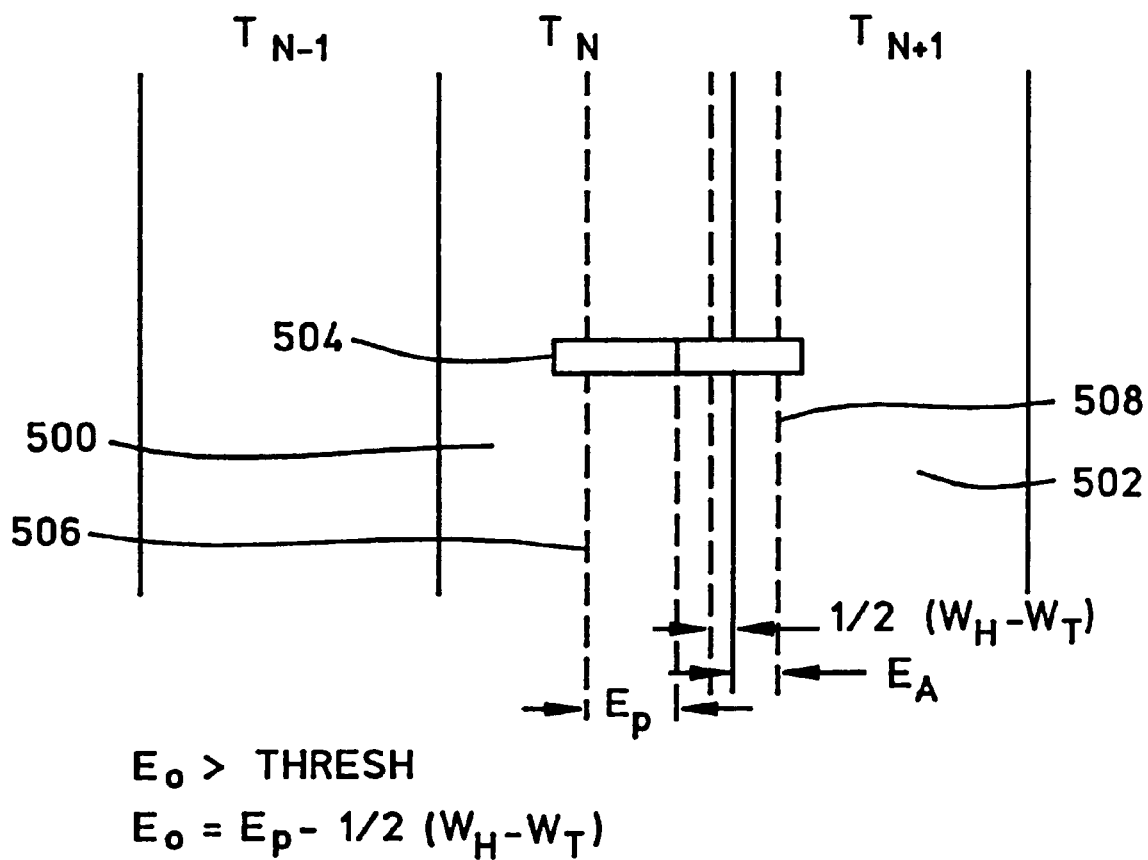
FIG. 7 is a plan view of the data tracks of the disk, where the magnetic head is positioned substantially off-center relative to the target track.

For some further detail, FIGS. 5, 6, and 7 illustrate plan views of tracks on a hard disk. The relationships below provided in connection with FIGS. 5–7 (as well as others) may be utilized in the generation of the data indicative of track overshoot (step 416 of FIG. 4B) and/or in the detection of the data exceeding threshold criteria (step 418 of FIG. 4B). FIGS. 5–7 show three tracks represented by $T_N$ (center track), $T_{N+1}$ (rightmost track), and $T_{N-1}$ (leftmost track). Track $T_N$ is represented as a target track 500, and track $T_{N+1}$ is represented as an adjacent track 502. Target track 500 has a center represented by a dashed line 506.

Referring more particularly to FIG. 5, each of the tracks, such as target track 500, has a track width $W_T$. A magnetic head 504 is shown positioned substantially in the center of target track 500 and has a head width $W_H$. As described above, the head width may be indicative of the physical head width or the magnetic head width of magnetic head 504. Half of the difference between the head width $W_H$ and the track width $W_T$ is the amount of "leeway" provided between the edge of magnetic head 504 and the edge of adjacent track 502. Present designs, including that described herein, typically provide a $W_H/W_T$ ratio of somewhere between eighty and ninety percent. Also shown is a dashed line 508, which provides a boundary defining a maximum allowable error $E_A$ for overshoot along adjacent track 502. This dashed line 508 is indicative of the threshold associated with the maximum track overshoot.

Referring now to FIG. 6, magnetic head 504 is shown positioned somewhat off-center in relation to target track 500. A position error $E_P$, which may be determined from the PES, represents the magnitude of the off-center position. Given such information, an overshoot error $E_O$ may be determined based on the relationship:

$$E_O = E_P - \tfrac{1}{2}(W_H - W_T).$$

In FIG. 6, the off-center position is great enough to invoke a write fault (as described in relation to step 404 of FIG. 4A), but not great enough to exceed the overshoot threshold represented by dashed line 508 (as described in relation to step 418 of FIG. 4B). Viewing dashed line 508, it is apparent that $E_O$<THRESH and therefore steps 420 and 422 of FIG. 4B are not executed in response to the write fault.

Referring now to FIG. 7, magnetic head 504 is shown positioned substantially off-center in relation to target track 500. In FIG. 7, it is apparent that the off-center position is great enough to exceed the threshold associated with the maximum track overshoot. That is, $E_O$>THRESH, where steps 420 and 422 of FIG. 4B are performed in response to the write fault.

Operation may be based on many other suitable relationships, such as:

IF $E_P - \frac{1}{2}(W_H - W_T) - E_A > 0$ THEN REWRITE ADJACENT TRACKS

In any case, $\frac{1}{2}(W_H - W_{MT})$ or $(W_H - W_T)$ may be alternatively expressed and stored as some ratio of $W_H$ and $W_T$.

As described herein, the present invention may therefore be embodied as a method including the steps of determining, in response to a write fault, whether an excessive track overshoot condition exists based on current head position, head width, and threshold criteria; and if an excessive track overshoot condition exists, reading and rewriting data to a track adversely affected thereby. In addition, the present invention may be embodied as a computer program product involving a storage medium, and software encoded on the storage medium which is executable for determining, in response to a write fault, whether an excessive track overshoot condition exists based on current head position, head width, and threshold criteria; and if an excessive track overshoot condition exists, reading and rewriting data to a track adversely affected thereby. Also, the present invention may be embodied as a disk drive having a processor executable for determining, in response to a write fault, whether an excessive track overshoot condition exists based on current head position, head width, and threshold criteria; and if an excessive track overshoot condition exists, reading and rewriting data to a track adversely affected thereby.

Thus, interference is removed when undesirable overshoot is detected. Since such interference would otherwise adversely affect the signal-to-noise ratio (SNR) of the tracks, data integrity of the disk drive system is improved. Preferably, such "cleanup" occurs substantially immediately after every overshoot not meeting the threshold criteria, thereby maintaining "cleaner" tracks on an ongoing basis rather than allowing the gradual build-up of substantial interference to cause later soft and/or hard errors. Efforts to decrease the size of magnetic heads, which tend to exacerbate "squeeze hard error" problems, have less impact on these inventive disk drives because any additional interference created therefrom is erased or reduced.

While the present invention has been described in its preferred embodiments, it is to be understood that the invention is not confined to the precise disclosure contained herein but may be otherwise embodied in various changes, modifications, and improvements which may be performed by those skilled in the art without departing from the true spirit and scope of the invention. For example, it is understood that the track overshoot, the head width, and the current head position may be substituted with or represented by values or signals that are proportional to or generally indicative of those individual or combined quantities or values.

I claim:

1. A method of improving data integrity in a disk drive system, the method comprising:
   determining, in response to a write fault, whether an excessive track overshoot condition exists based on current head position, head width, and threshold criteria; and
   if an excessive track overshoot condition exists, reading and rewriting data to a track adversely affected thereby.

2. The method according to claim 1, wherein determining comprises:
   generating data indicative of track overshoot based on the head width and the current head position;
   comparing the data and the threshold criteria; and
   if the data does not meet the threshold criteria, determining that the excessive track overshoot condition exists.

3. The method according to claim 2, wherein generating data comprises generating data indicative of track overshoot based on current head position involving a position error signal (PES).

4. The method according to claim 1, wherein reading and rewriting data comprises reading and rewriting data during a data recovery mode of the disk drive system.

5. The method according to claim 1, wherein reading and rewriting data comprises reading and rewriting data during an idle mode of the disk drive system.

6. The method according to claim 1, further comprising:
   if the excessive track overshoot condition exists, storing at least one address associated with the data from the track.

7. A computer program product for improving data integrity in a disk drive system, the computer program product comprising a computer readable storage medium and a computer program mechanism embedded therein, said computer program mechanism having instructions for:
   determining, in response to a write fault, whether an excessive track overshoot condition exists based on current head position, head width, and threshold criteria; and
   if an excessive track overshoot condition exists, reading and rewriting data to a track adversely affected thereby.

8. The computer program product according to claim 7, wherein said computer program mechanism has instructions for determining comprising:
   generating data indicative of track overshoot based on the head width and the current head position;
   comparing the data and the threshold criteria; and
   if the data does not meet the threshold criteria, determining that the excessive track overshoot condition exists.

9. The computer program product according to claim 8, wherein said computer program mechanism has instructions for generating the data indicative of track overshoot based on the head width and current head position involving a position error signal (PES).

10. The computer program product according to claim 7, wherein said computer program mechanism has instructions for reading and rewriting data comprising reading and rewriting data during a data recovery mode of the disk drive system.

11. The computer program product according to claim 7, wherein said computer program mechanism has instructions for reading and rewriting data comprising reading and rewriting data during an idle mode of the disk drive system.

12. The computer program product according to claim 7, wherein said computer program mechanism has further instructions for:

if the excessive track overshoot condition exists, storing at least one address associated with the data of the track.

13. A disk drive, comprising:

a magnetic head for writing data to a disk;

an actuator arm carrying said magnetic head;

a processor executable for controlling said actuator arm and for:
   determining, in response to a write fault occurring during a write to one or more tracks of said disk, whether an excessive track overshoot condition exists based on threshold criteria, current head position, and head width of said magnetic head; and
   if an excessive track overshoot condition exists, reading and rewriting data to an adjacent track adversely affected thereby.

14. The disk drive according to claim 13, wherein said processor is executable for determining based on:
   generating data indicative of track overshoot based on the current head position and the head width of said magnetic head;
   comparing the data and the threshold criteria; and
   if the data does not meet the threshold criteria, determining that the excessive track overshoot condition exists.

15. The disk drive according to claim 14, wherein said processor is further executable for generating the data indicative of track overshoot based on current head position involving a position error signal (PES).

16. The disk drive according to claim 13, wherein said processor is executable for reading and rewriting data including reading and rewriting data during a data recovery mode of the disk drive system.

17. The disk drive according to claim 13, wherein said processor is executable for reading and rewriting data including reading and rewriting data during an idle mode of the disk drive system.

18. The disk drive according to claim 13, wherein said processor is further executable for:
   if the excessive track overshoot condition exists, storing at least one address associated with the data of the track.

19. A method of reducing squeeze hard error in a disk drive system, the disk drive system including a disk drive and one or more hard disks, the disk drive operative in connection with embedded servo patterns and tracks of the hard disk, the method comprising:
   writing data along a track of the hard disk;
   inadvertently writing the data along at least a portion of one or more tracks adjacent to the track;
   in response to the inadvertent writing to the adjacent track, determining track overshoot based on a position error signal (PES) and pre-stored head width data;
   comparing the track overshoot and a threshold; and
   in response to the track overshoot exceeding the threshold, reading and rewriting data to the one or more adjacent tracks to reduce the affect of the overshoot.

20. A method, comprising:
   generating data indicative of track overshoot based on current head position and head width; and
   in response to the data not meeting threshold criteria, reading and rewriting data to a track to remove overshoot error.

* * * * *